Figure 1:
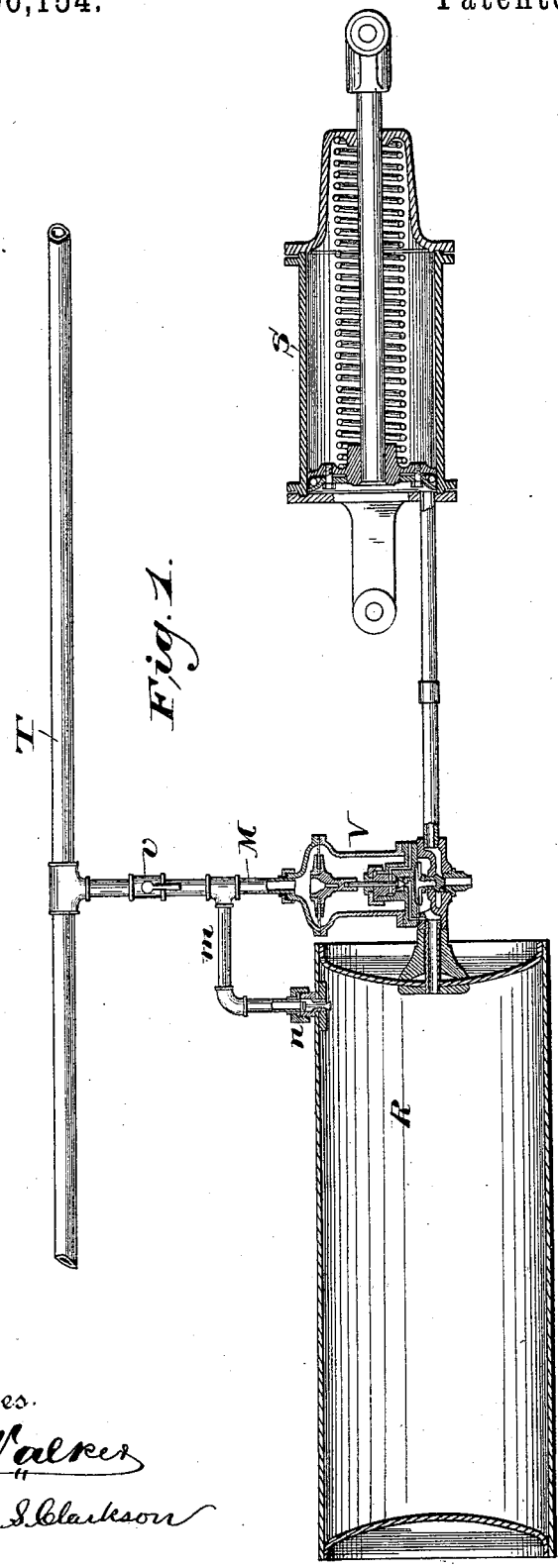

(No Model.) 2 Sheets—Sheet 1.

H. GUELS.
VALVE FOR FLUID PRESSURE BRAKES.

No. 396,154. Patented Jan. 15, 1889.

Witnesses
E. G. Walker
Edwin I. Clarkson

Inventor
Herman Guels
by F. W. Ritter Jr.
atty (No Model.) 2 Sheets—Sheet 2.
H. GUELS.
VALVE FOR FLUID PRESSURE BRAKES.
No. 396,154. Patented Jan. 15, 1889.
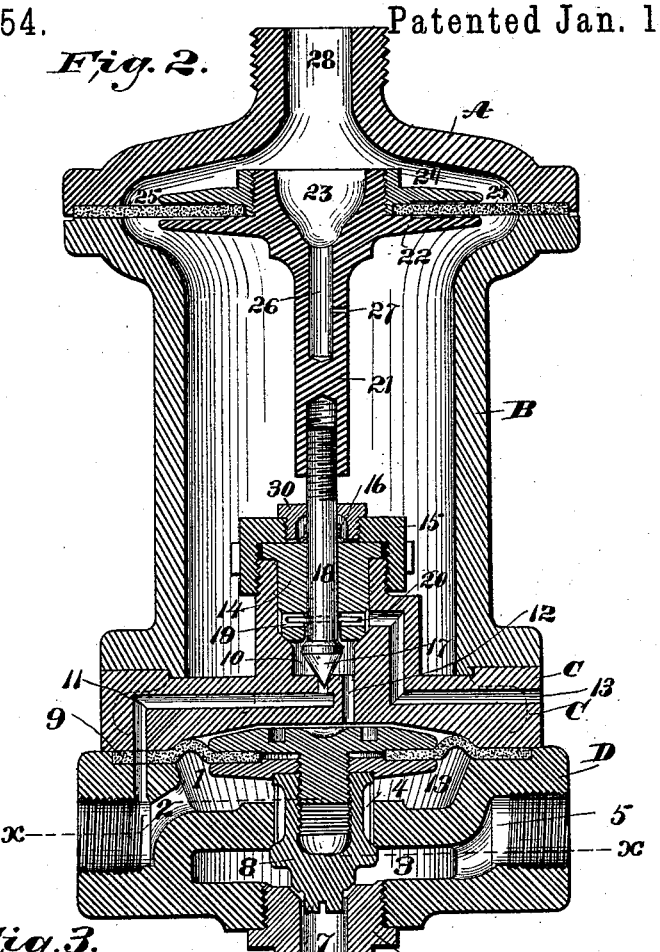
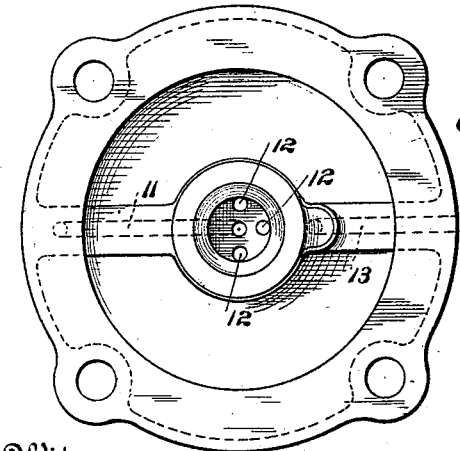
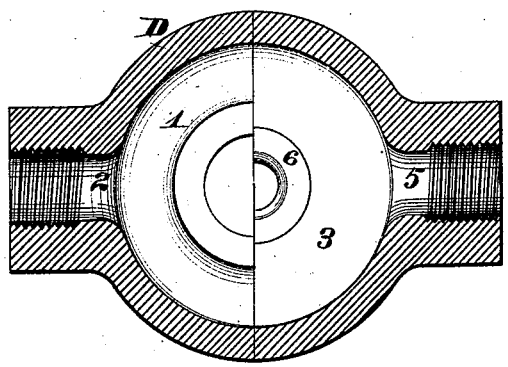
Witnesses.
E. T. Walker
Edwin S. Clarkson
Inventor.
Herman Guels
By his Attorney F. W. Ritter Jr.

UNITED STATES PATENT OFFICE.

HERMAN GUELS, OF ST. LOUIS, MISSOURI, ASSIGNOR TO THE AMERICAN BRAKE COMPANY, OF SAME PLACE.

VALVE FOR FLUID-PRESSURE BRAKES.

SPECIFICATION forming part of Letters Patent No. 396,154, dated January 15, 1889.

Application filed August 21, 1888. Serial No. 283,333. (No model.)

To all whom it may concern:

Be it known that I, HERMAN GUELS, a citizen of the United States, residing at St. Louis, in the State of Missouri, have invented certain new and useful Improvements in Valves for Fluid-Pressure Brakes; and I hereby declare the following to be a full, clear, and exact description of the same, reference being had to the accompanying drawings, wherein—

Figure 1 is a view of a brake-cylinder, auxiliary reservoir portion of the train-pipe, and a sectional view of the fluid-pressure valve embodying my invention, showing the position of the latter in the system. Fig. 2 is an enlarged longitudinal sectional view of the valve. Fig. 3 is a plan or face view of the shell-section C. Fig. 4 is a transverse section of the shell-section D on the line $x\,x$, Fig. 2.

Like letters and figures refer to like parts wherever they occur.

My present invention relates to the construction and manner of operating the valves of fluid-pressure brakes, and is herein illustrated as applied to the alternate system, or that wherein the brakes are applied and released by alternately admitting air under pressure to one side of the piston, and then exhausting it therefrom.

The object I have in view is to render the valves sensitive and quick-acting, so as to apply and release the brakes rapidly and with the minimum variation of pressure in the train-pipe.

By a previous invention, for which application Serial No. 264,493 was filed by me on February 18, 1888, I accomplished this by combining with a balanced valve actuated by the pressure of the air in the auxiliary reservoir a valve actuated by the pressure in the train-pipe, which latter valve controlled the pressure and exhaust ports of the balanced valve. In said case a scale mechanism and valve were employed in an air-chamber to maintain the preponderance of power or pressure in said air-chamber above the pressure in the train-pipe to prevent the release of the brakes when the pressure was low in or absent from the train-pipe.

The main feature of my present invention consists in obtaining the same result by greatly-simplified mechanism and in substantially a different manner—viz., by connecting the air or expansion chamber of the second valve with the train-pipe by a leak, which establishes an equilibrium of pressure between said chamber and the train-pipe, and by proportioning the area of the valve which controls the balance-valve to the area of its stem, so that the preponderance of power or pressure shall cause the auxiliary-reservoir air to seat the said valve at all times when the pressure is equal or lower in the train-pipe.

I will now proceed to describe my invention more specifically, so that others skilled in the art to which it appertains may apply the same.

In the drawings, T indicates the train-pipe; $v$, the usual valve for cutting off the auxiliary reservoir and cylinder therefrom; M, the branch pipe leading from the train-pipe to the valve; $m$, a branch provided with a check-valve, $n$, leading directly to the auxiliary reservoir; R, the auxiliary reservoir; S, the brake-cylinder, and V the fluid-pressure valve.

There being nothing peculiar in the construction of the reservoir and cylinder, no special description thereof is necessary.

The fluid-pressure valve V may have a shell composed of several sections, A B C D, of which the section D will contain the balanced valve proper, which controls the ports leading from the reservoir to the cylinder, and also the exhaust-port for the cylinder, while the section C will contain the secondary valve, controlling the inlet and exhaust port of the balanced valve. The section D has a chamber, 1, which I term the "diaphragm-chamber," and which connects by means of port or passage 2 with the auxiliary reservoir R, and a chamber, 3, which I term the "valve-chamber," and which connects by passage 4 with chamber 1 and by passage 5 with the cylinder. The bottom of valve-chamber 3 is closed by a bushing, 6, in which is the exhaust-port 7 for the cylinder, and on it is formed the lower seat of the balance-valve. Within the valve-chamber 3 is the double-seated or two-seated valve 8, arranged to alternately close the passage 4 and exhaust-port 7, the stem of said valve being connected with a diaphragm, 9, (or its equivalent, a piston,) arranged in the diaphragm-chamber and held between or clamped by the sections C D of the shell. Leading from the port or passage 2 to a secondary-valve chamber, 10, on one side of the diaphragm 9 is a port or passage, 11, and from said secondary-valve chamber 10 a port, 12, leads to the upper side of diaphragm 9, while a small exhaust-port, 13, leads from secondary-valve chamber 10 to the outer air. The valve-chamber 10 is closed by an annular plug or gland, 14, on the end of which is a valve-seat for the secondary valve, said plug or gland being held by a nut or screw-cap, 15, encircling valve-stem 18, and resting on plug or gland 14 is a cupped washer, 16, which is held by a hollow nut, 30, that serves to contain a lubricant to preserve the washer and insure a tight joint.

17 indicates the secondary valve, arranged in secondary-valve chamber 10, and adapted to alternately close the port or passage 11, leading from the auxiliary reservoir, and the exhaust port or passage 13, leading from the chamber 10. The stem 18 of valve 17 passes through the annular plug or gland 14, and is preserved from turning therein by means of a pin, 19, which passes through the valve-stem and through transverse holes 20, made in plug 14.

The cross-sectional area of valve 17 must be somewhat greater than the cross-sectional area of its stem 18, for reasons which will hereinafter appear.

The end of valve-stem 18 is secured to stem 21, which extends from a disk, 22, having a threaded stub, 23, and which, in conjunction with a threaded annular disk, 24, clamps a diaphragm, 25, held between the sections A and B of the valve-shell. This stem 21 is hollow or bored out for part of its length, as at 26, and leading from said cavity is a leak-port, 27. The section A of the valve-shell has a port or passage, 28, by means of which (and pipes M) it connects directly with the train-pipe T. It will thus be seen that the diaphragm 25, which is connected with the secondary valve 17, is placed in direct connection with the air in the train-pipe T, and that by means of the leak-port 27 an equilibrium of pressure on both sides of said diaphragm can be established, so as to render the diaphragm (and the secondary valve 17) responsive to the slightest variations of pressure in the train-pipe, if said variations are quickly made, but a continuous slight leakage is not operative. Under these conditions the secondary valve 17 would at times be a balanced valve if some means were not taken to prevent it, and it is for this reason that the cross-sectional area of valve 17 is made greater than that of its stem 18. Consequently when the pressure is reduced quickly in the train-pipe T to apply the brakes the initial expansion of the air in shell B gives a momentary impulse to diaphragm 25, which lifts the secondary valve 17, closes exhaust-passage 13, and opens passage 11, leading from the auxiliary reservoir to chamber 10. Thereafter the reservoir-pressure on secondary valve 17 will keep it seated on exhaust-passage 13, because the cross-area of the valve exceeds that of its stem, though at any time after the pressure has been equalized (by means of leak 27) on both sides of diaphragm 25 a slight increase of pressure in the train-pipe being multiplied by diaphragm 25 will seat secondary valve 17 on port or passage 11, open exhaust 13, and release the brakes, whereupon, owing to the small area of that part of the valve 17 which is over passage 11 and exposed to the reservoir-pressure, the preponderance of pressure will be reversed, and will hold the valve down until the next impulse is given to diaphragm 25 by again reducing the pressure in the train-pipe.

The operation of the valve is as follows: A slight sudden reduction of pressure in the train-pipe T permits the expansion of the air in shell B, giving an impulse to diaphragm 25, which lifts the secondary valve 17 and closes exhaust-passage 13. Equilibrium of pressure on the two sides of diaphragm 25 quickly takes place owing to leak 27; but the difference of pressure on valve 17, owing to the comparative cross-area of it and its stem, keeps the valve 17 seated on exhaust-port 13, as before specified. The air from auxiliary reservoir R has meanwhile passed by passages 11 and 12 to the opposite side of diaphragm 9, causing the balanced valve 8 to move so as to seat itself and close the exhaust-port 7 and open passage 4, establishing communication between the reservoir R and cylinder S through passages 2, 3, 4, and 5. When the brakes are applied, a slight increase of pressure in the train-pipe will, before equalization through leak 27 can take place, give a reverse impulse to diaphragm 25, forcing secondary valve 17 off of exhaust-port 13 and down on port or passage 11, which will permit the exhaust of the air from diaphragm 9 through ports 12 and 13, and the diaphragm 9 will be reversely shifted by the pressure of the auxiliary reservoir, so as to close passage 4 and open exhaust-port 7, thus taking off the brakes.

Having thus described my invention, what I claim, and desire to secure by Letters Patent, is—

1. In a valve for fluid-pressure brakes, the combination of a balanced valve having ports leading to the reservoir and cylinder, a secondary valve having ports leading from the reservoir and balanced valve, and an exhaust-port, a diaphragm-chamber which communicates with the train-pipe, and a diaphragm connected with the secondary valve, and having a leak-port which is constantly open, substantially as and for the purposes specified.

2. In a valve for fluid-pressure brakes, the combination of a balanced valve having ports leading to the reservoir and cylinder, a secondary valve whose stem is of less cross-sectional area than the valve, ports leading from the auxiliary reservoir to the secondary-valve chamber and to the balanced valve, an exhaust-port for the secondary-valve chamber, a diaphragm-chamber connected with the train-pipe, and a diaphragm connected with the secondary valve and having a leak-port, substantially as and for the purposes specified.

3. The combination, with the valve-stem 18, of the perforated annular plug or gland 14 and the pin 19, substantially as and for the purposes specified.

In testimony whereof I affix my signature, in presence of two witnesses, this 26th day of July, 1888.

HERMAN GUELS.

Witnesses:
 JNO. R. WILLIAMS,
 JOHN C. H. STEVENSON.